US007986127B2

(12) United States Patent  (10) Patent No.: US 7,986,127 B2
Fischer et al.  (45) Date of Patent: Jul. 26, 2011

(54) COMMUNICATION DEVICE WITH A USB PORT FOR CHARGING

(75) Inventors: Daniel M. Fischer, Waterloo (CA); Dan G. Radut, Waterloo (CA); Michael F. Habicher, Cambridge (CA); Quang A. Luong, Kitchener (CA); Jonathan T. Malton, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/905,934

(22) Filed: Oct. 15, 2010
(Under 37 CFR 1.47)

(65) Prior Publication Data

US 2011/0025262 A1  Feb. 3, 2011

Related U.S. Application Data

(63) Continuation of application No. 12/714,204, filed on Feb. 26, 2010, now Pat. No. 7,834,586, which is a continuation of application No. 12/268,297, filed on Nov. 10, 2008, now Pat. No. 7,737,657, which is a continuation of application No. 11/749,680, filed on May 16, 2007, now Pat. No. 7,453,233, which is a continuation of application No. 11/175,885, filed on Jul. 6, 2005, now Pat. No. 7,239,111, which is a continuation of application No. 10/087,629, filed on Mar. 1, 2002, now Pat. No. 6,936,936.

(60) Provisional application No. 60/330,486, filed on Oct. 23, 2001, provisional application No. 60/273,021, filed on Mar. 1, 2001.

(51) Int. Cl.
*H01M 10/46* (2006.01)

(52) U.S. Cl. ..................................... 320/111

(58) Field of Classification Search .................. 320/107, 320/111, 114, 140
See application file for complete search history.

(56) References Cited

U.S. PATENT DOCUMENTS 3,775,659 A  11/1973  Carlsen, II
(Continued)

FOREIGN PATENT DOCUMENTS

CA  2517333 A1  9/2002
(Continued)

OTHER PUBLICATIONS

Electric Double-Layer Capacitors, vol. 2, Japan, Tokin Corporation, Cat. No. EC-200E, Oct. 25, 1996, 40 pgs.
(Continued)

*Primary Examiner* — Edward Tso
(74) *Attorney, Agent, or Firm* — Finnegan, Henderson, Farabow, Garrett & Dunner, LLP

(57) ABSTRACT

An adapter for providing a source of power to a mobile device through an industry standard port is provided. In accordance with one aspect of the invention, the adapter comprises a plug unit, a power converter, a primary connector, and an identification subsystem. The plug unit is operative to couple the adapter to a power socket and operative to receive energy from the power socket. The power converter is electrically coupled to the plug unit and is operable to regulate the received energy from the power socket and to output a power requirement to the mobile device. The primary connector is electrically coupled to the power converter and is operative to couple to the mobile device and to deliver the outputted power requirement to the mobile device. The identification subsystem is electrically coupled to the primary connector and is operative to provide an identification signal.

12 Claims, 4 Drawing Sheets

U.S. PATENT DOCUMENTS

| | | | |
|---|---|---|---|
| 4,433,251 A | 2/1984 | Banks et al. | |
| 4,510,431 A | 4/1985 | Winkler | |
| 5,173,855 A | 12/1992 | Nielsen et al. | |
| 5,229,649 A | 7/1993 | Nielsen et al. | |
| 5,272,475 A | 12/1993 | Eaton et al. | |
| 5,444,378 A | 8/1995 | Rogers | |
| 5,631,503 A | 5/1997 | Cioffi | |
| 5,638,540 A | 6/1997 | Aldous | |
| 5,651,057 A | 7/1997 | Blood et al. | |
| 5,769,877 A | 6/1998 | Barreras, Sr. | |
| 5,850,113 A | 12/1998 | Weimer et al. | |
| 5,939,860 A | 8/1999 | William | |
| 6,006,088 A | 12/1999 | Couse | |
| 6,104,162 A | 8/2000 | Sainsbury et al. | |
| 6,104,759 A | 8/2000 | Carkner et al. | |
| 6,130,518 A | 10/2000 | Gabehart et al. | |
| 6,138,242 A | 10/2000 | Massman et al. | |
| 6,184,652 B1 | 2/2001 | Yang | |
| 6,211,649 B1 | 4/2001 | Matsuda | |
| 6,252,375 B1 | 6/2001 | Richter et al. | |
| 6,255,800 B1 | 7/2001 | Bork | |
| 6,283,789 B1 | 9/2001 | Tsai | |
| 6,357,011 B2 | 3/2002 | Gilbert | |
| 6,397,696 B2 | 6/2002 | Ogami | |
| 6,663,420 B1 | 12/2003 | Xiao | |
| 6,668,296 B1 | 12/2003 | Dougherty et al. | |
| 6,738,856 B1 | 5/2004 | Milley et al. | |
| 7,159,132 B2 | 1/2007 | Takahashi et al. | |
| 7,170,259 B2 | 1/2007 | Veselic | |
| 7,340,627 B1 | 3/2008 | Harvey | |
| 7,629,767 B2 | 12/2009 | Kang | |
| 7,631,111 B2 | 12/2009 | Monks et al. | |
| 7,698,490 B2 | 4/2010 | Terrell, II | |
| 7,737,657 B2 | 6/2010 | Fischer et al. | |
| 7,812,565 B2 | 10/2010 | Bayne et al. | |
| 7,884,570 B2 | 2/2011 | Purdy et al. | |
| 2001/0003205 A1 | 6/2001 | Gilbert | |
| 2003/0034898 A1 | 2/2003 | Shamoon et al. | |
| 2004/0063464 A1 | 4/2004 | Akram et al. | |
| 2004/0251878 A1 | 12/2004 | Veselic | |
| 2005/0269883 A1 | 12/2005 | Drader et al. | |
| 2006/0181241 A1* | 8/2006 | Veselic | 320/107 |
| 2007/0108938 A1* | 5/2007 | Veselic | 320/111 |
| 2009/0128091 A1* | 5/2009 | Purdy et al. | 320/106 |
| 2009/0130874 A1 | 5/2009 | Englund | |
| 2010/0052620 A1 | 3/2010 | Wong | |
| 2010/0060233 A1 | 3/2010 | Kung et al. | |
| 2010/0201308 A1 | 8/2010 | Lindholm | |

FOREIGN PATENT DOCUMENTS

| | | |
|---|---|---|
| EP | 0684680 B1 | 7/1999 |
| EP | 1198049 A1 | 4/2002 |
| JP | 2005063355 | 3/2005 |
| WO | 0101330 A1 | 1/2001 |

OTHER PUBLICATIONS

Supercapacitor: User's Manual, vol. 2, Japan, Tokin Corporation, Jan. 1997, 47 pgs.

Charging Big Supercaps, Portable Design, Mar. 1997, p. 26.

Office Action dated Aug. 18, 2009; U.S. Appl. No. 12/268,297; Filed Nov. 10, 2008; 9 pgs.

Office Action dated Aug. 5, 2010; U.S. Appl. No. 12/714,204; Filed Feb. 26, 2010; 11 pgs.

U.S. Office Action dated Sep. 25, 2007; U.S. Appl. No. 11/749,680, filed May 16, 2007 (9 pages).

U.S. Office Action dated Aug. 24, 2006; U.S. Appl. No. 11/175,885, filed Jul. 6, 2005 (6 pages).

U.S. Office Action dated Apr. 4, 2006; U.S. Appl. No. 11/175,885, filed Jul. 6, 2005 (5 pages).

U.S. Office Action dated Oct. 20, 2005; U.S. Appl. No. 11/175,885, filed Jul. 6, 2005 (8 pages).

U.S. Office Action dated Sep. 7, 2004; U.S. Appl. No. 10/087,629, filed Mar. 1, 2002 (6 pages).

Canadian Office Action dated Mar. 12, 2004 issued in Canadian Application No. 2,374,344 (3 pages).

* cited by examiner

COMMUNICATION DEVICE WITH A USB PORT FOR CHARGING

CROSS-REFERENCE TO RELATED APPLICATIONS

This is a continuation application of U.S. patent application Ser. No. 12/714,204 filed Feb. 26, 2010, by Daniel M. Fischer, et al. and entitled "Multifunctional Charger System and Method," which is a continuation of U.S. patent application Ser. No. 12/268,297 filed Nov. 10, 2008 now U.S. Pat. No. 7,737,657 issued on Jun. 15, 2010, by Daniel M. Fischer, et al. and entitled "System and Method for Charging a Battery in a Mobile Device," which is a continuation of U.S. patent application Ser. No. 11/749,680, filed May 16, 2007, now U.S. Pat. No. 7,453,233 issued on Nov. 18, 2008 by Daniel M. Fischer, et al. and entitled "Adapter System and Method for Powering a Device," which is a continuation of U.S. patent application Ser. No. 11/175,885, filed on Jul. 6, 2005, now U.S. Pat. No. 7,239,111 issued on Jul. 3, 2007, by Daniel M. Fischer, et al. and entitled "Universal Serial Bus Adapter for a Mobile Device," which is a continuation of U.S. patent application Ser. No. 10/087,629, filed on Mar. 1, 2002, now U.S. Pat. No. 6,936,936 issued on Aug. 30, 2005, by Daniel M. Fischer, et al. and entitled "Multifunctional Charger System and Method," which claims priority from U.S. Provisional Application No. 60/273,021 filed Mar. 1, 2001, by Daniel M. Fischer, et al. and entitled "System and Method for Adapting a USB to Provide Power for Charging a Mobile Device" and U.S. Provisional Application No. 60/330,486 filed Oct. 23, 2001, by Daniel M. Fischer, et al. and entitled "Multifunctional Charger System and Method." Each of the above patent applications is hereby incorporated herein by reference in its entirety for all purposes.

BACKGROUND

This invention relates generally to power adapters. More particularly, the invention relates to power adapters for use with mobile devices.

Providing an external source of power to a mobile device, such as a personal digital assistants ("PDA"), mobile communication device, cellular phone, wireless two-way e-mail communication device, and others, requires design considerations with respect to both the mobile device and the power source. With regard to the mobile device, most mobile devices provide a distinct power interface for receiving power from a power source, for instance to recharge a battery, and a separate data interface for communicating. For example, many mobile devices presently use USB (Universal Serial Bus) interfaces for communicating and use a separate power interface, such as a barrel connector, for receiving power.

It is desirable, however, to have a combined power and data interface. The mobile devices that do have combined power and data interfaces typically use non-standard and sometimes proprietary interfaces. Consequently, combined interfaces for a particular manufacturer's mobile device may not be compatible with combined interfaces for mobile devices provided by other manufacturers.

Although the USB interface can be used as a power interface, the USB is typically not used for that purpose by mobile devices. In accordance with the USB specification, typical USB power source devices, such as hubs and hosts, require that a USB device participate in a host-initiated process called enumeration in order to be compliant with the current USB specification in drawing power from the USB interface. Although a mobile device could be adapted to participate in enumeration when drawing power over the USB interface, it would be preferable in many situations, such as when a host would not be available, as often happens during normal use of a mobile device, to be able to utilize alternate power sources such as conventional AC outlets and DC car sockets that are not capable of participating in enumeration to supply power to the mobile device via a USB interface.

SUMMARY

An adapter for providing a source of power to a mobile device through an industry standard port is provided. In accordance with one aspect of the invention, the adapter comprises a plug unit, a power converter, a primary connector, and an identification subsystem. The plug unit is operative to couple the adapter to a power socket and operative to receive energy from the power socket. The power converter is electrically coupled to the plug unit and is operable to regulate the received energy from the power socket and to output a power requirement to the mobile device. The primary connector is electrically coupled to the power converter and is operative to couple to the mobile device and to deliver the outputted power requirement to the mobile device. The identification subsystem is electrically coupled to the primary connector and is operative to provide an identification signal.

In accordance with another aspect, a USB adapter for providing a source of power to a mobile device through a USB port is provided. The USB adapter comprises a plug unit, a power converter, a primary USB connector, and an identification subsystem. The plug unit is operative to couple the USB adapter to a power socket and operative to receive energy from the power socket. The power converter is electrically coupled to the plug unit and is operable to regulate the received energy from the power socket and to output a power requirement to the mobile device. The primary USB connector is electrically coupled to the power converter and is operative to couple to the mobile device and to deliver the outputted power requirement to the mobile device. The identification subsystem is electrically coupled to the primary connector and is operative to provide an identification signal.

Another aspect provides a USB adapter for providing a source of power to a mobile device through a USB port. The USB adapter comprises a plug unit, a power converter, a primary USB connector, and an auxiliary USB adapter. The plug unit is operative to couple the USB adapter to a power socket and operative to receive energy from the power socket. The power converter is electrically coupled to the plug unit and is operable to regulate the received energy from the power socket and to output a power requirement to the mobile device. The primary USB connector is electrically coupled to the power converter and is operative to couple to the mobile device and to deliver the outputted power requirement to the mobile device. The auxiliary USB connector has data lines that are electrically coupled to the data lines of the primary USB connector.

Yet another aspect provides a method for providing energy to a mobile device using a USB adapter that comprises a plug unit, a primary USB connector, a power converter electrically coupled between the plug unit and the primary USB connector, and an identification subsystem electrically coupled to the primary USB connector. The method comprising the steps of coupling the USB connector to the mobile device, coupling the plug unit to a power socket, outputting a power requirement to the mobile device via the power converter and the USB connector, and providing an identification signal to the mobile device, via the identification subsystem and the USB connector, that is operative to inform the mobile device that the USB adapter is not limited by the power limits imposed by the USB specification.

In accordance with another aspect, a powering system for a mobile device having a USB connector is provided. The powering system comprises a power distribution subsystem in the mobile device that is operable to receive energy through the USB connector and to distribute the energy to at least one component in the mobile device and a USB adapter that is operative to couple to the USB connector. The USB adapter comprises a plug unit for coupling to a power socket and that is operable to receive energy from the power socket, a power converter electrically coupled to the plug unit for regulating the received energy and for providing a power requirement to the power distribution subsystem, and an identification subsystem that is operable to transmit an identification signal that is operative to identify the USB adapter as not being limited by the power limits imposed by the USB specification.

BRIEF DESCRIPTION OF THE DRAWINGS

In order that the invention identified in the claims may be more clearly understood, preferred embodiments thereof will be described in detail by way of example, with reference to the accompanying drawings, in which:

DETAILED DESCRIPTION

Exemplary Mobile Device

Figure 1:
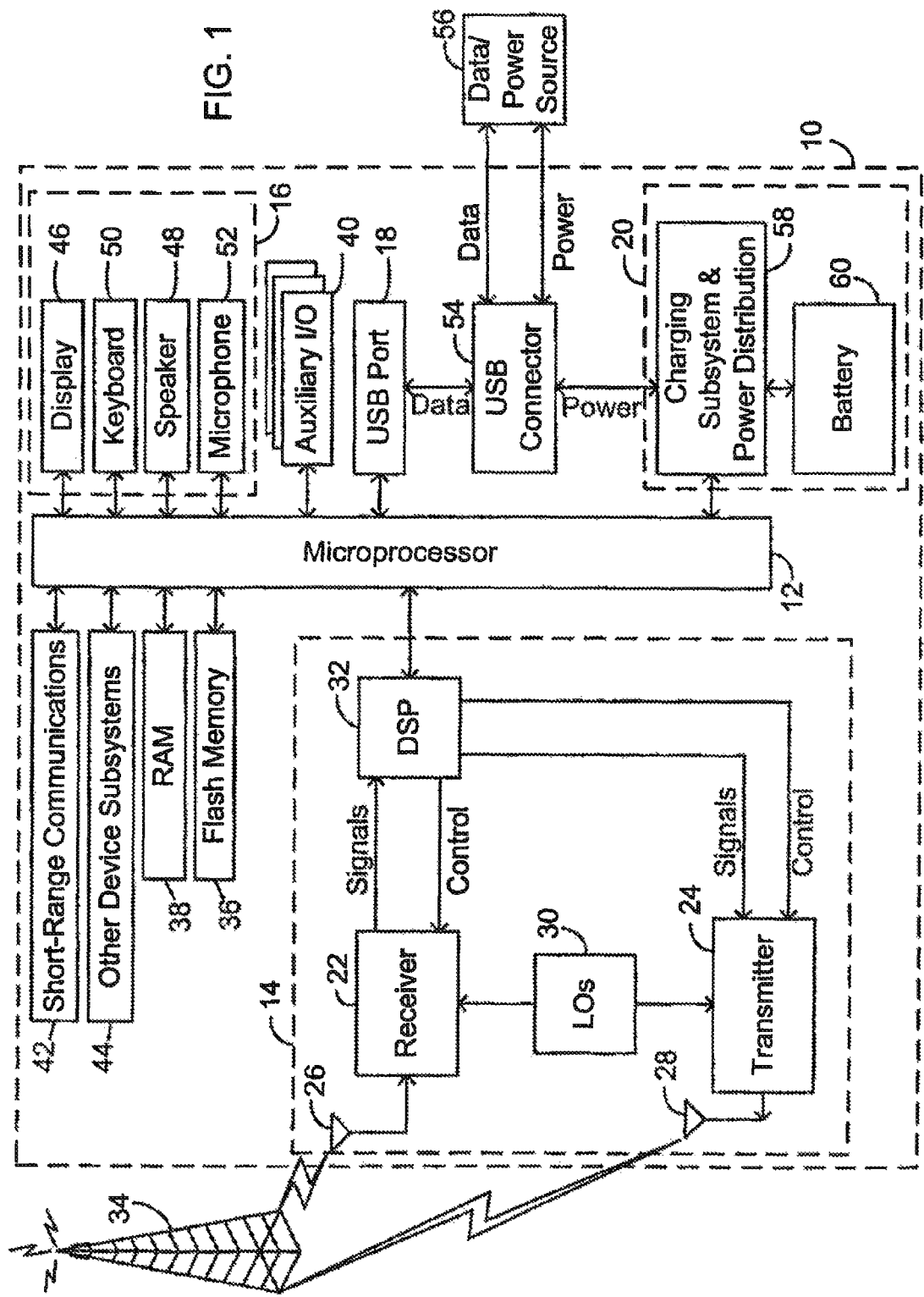
FIG. 1 is a schematic diagram of an exemplary mobile device which has an industry standard interface.

Turning now to the drawing figures, shown in FIG. 1 is a schematic diagram of an exemplary mobile communication device 10 which has an industry standard interface. The mobile communication device 10 is preferably a two-way communication device having at least voice or data communication capabilities. Preferably, the mobile device 10 is also capable of communicating over the Internet, for example, via a radio frequency ("RF") link. Examples of types of devices that could be classified as a mobile device 10 include a data messaging device, a two-way pager, a cellular telephone with data messaging capabilities, a wireless Internet appliance, a data communication device (with or without telephony capabilities), a personal digital assistants ("PDA"), a wireless two-way e-mail communication device, and others.

The exemplary mobile device 10 comprises a microprocessor 12, a communication subsystem 14, input/output ("I/O") devices 16, an industry standard interface 18 which in this example is a USB port, and a power subsystem 20. The microprocessor 12 controls the overall operation of the mobile device 10. The communication subsystem 14 provides the mobile device 10 with the ability to communicate wirelessly with external devices such as other mobile devices and other computers. The I/O devices 16 provide the mobile device 10 with input/output capabilities for use with a device user. The USB port 18 provides the mobile device 10 with a serial port for linking directly with other computers and/or a means for receiving power from an external power source. The power subsystem 20 provides the mobile device 10 with a local power source.

The exemplary communication subsystem 14 comprises components such as a receiver 22, a transmitter 24, antenna elements 26 and 28, local oscillators (LOs) 30, and a processing module such as a digital signal processor (DSP) 32. The particular design of the communication subsystem 14 and the components used therein can vary. It would be apparent to one of ordinary skill in the art to design an appropriate communication subsystem using conventional methods and components to operate over a communication network 34 based on the parameters necessary to operate over that communication network. For example, a mobile device 10 geographically located in North America may include a communication subsystem 14 designed to operate within the Mobitex™ mobile communication system or DataTAC™ mobile communication system, whereas a mobile device 10 intended for use in Europe may incorporate a General Packet Radio Service (GPRS) communication subsystem 14.

Network access requirements will also vary depending upon the type of network 34. For example, in the Mobitex and DataTAC networks, mobile devices 10 are registered on the network using a unique personal identification number or PIN associated with each device. In GPRS networks however, network access is associated with a subscriber or user of a mobile device 10. A GPRS device therefore requires a subscriber identity module (not shown), commonly referred to as a SIM card, in order to operate on a GPRS network. Without a SIM card, a GPRS device will not be fully functional. Local or non-network communication functions (if any) may be operable, but the mobile device 10 will be unable to carry out any functions involving communications over the network 34.

When required, after the network registration or activation procedures have been completed, a mobile device 10 may send and receive communication signals over the network 34. Signals received by the receiver antenna 26 through a communication network 34 are input to the receiver 22, which may perform such common receiver functions as signal amplification, frequency down conversion, filtering, channel selection and the like, and in the exemplary system shown in FIG. 1, analog to digital conversion. Analog to digital conversion of a received signal allows more complex communication functions such as demodulation and decoding to be performed in a DSP 32. Similarly, signals to be transmitted are processed, including modulation and encoding for example, by the DSP 32 and input to the transmitter 24 for digital to analog conversion, frequency up conversion, filtering, amplification and transmission over the communication network 34 via the transmitter antenna 28.

Also, in the exemplary communication subsystem 14, the DSP 32 processes communication signals and also provides for receiver and transmitter control. For example, the gains applied to communication signals in the receiver 22 and transmitter 24 may be adaptively controlled through automatic gain control algorithms implemented in the DSP 32.

In implementing its control function, the microprocessor 12 in the exemplary mobile device 10 executes an operating system. The operating system software used by the microprocessor 12 is preferably stored in a persistent store such as flash memory 36, or alternatively read only memory (ROM) or similar storage element. The microprocessor 12 may also enable the execution of specific device applications, which preferably are also stored in a persistent store. The operating system, specific device applications, or parts thereof, may also be temporarily loaded into a volatile store such as in RAM 38.

A predetermined set of applications which control basic device operations, including at least data and voice communication applications for example, will normally be installed on the mobile device 10 during manufacture. One such application loaded on the mobile device 10 could be a personal information manager (PIM) application. The PIM application preferably is an application for organizing and managing user inputted data items such as e-mail, calendar events, voice mails, appointments, and task items. The PIM data items may be stored in the RAM 38 and/or the flash memory 36.

The PIM application preferably has the ability to send and receive data items, via the wireless network 34. The PIM data items are preferably seamlessly integrated, synchronized and updated, via the wireless network 34, with corresponding data items stored or associated with a host computer system (not shown) used by the device user. The synchronization of PIM data items is a process by which the PIM data items on the mobile device 10 and the PIM data items on the host computer system can be made to mirror each other.

There are several possible mechanisms for loading applications onto the mobile device 10. For example, applications may be loaded onto the mobile device 10 through the wireless network 34, an auxiliary I/O subsystem 40, the serial port 18, a short-range communications subsystem 42, such as an infrared ("IR") communication system, or any other suitable subsystem 44. When loading the applications onto the mobile device 10, the device user may install the applications in the RAM 38, the flash memory 36, or preferably a non-volatile store (not shown) such as ROM for execution by the microprocessor 12. The available application installation mechanisms can increase the utility of the mobile device 10 by providing the device user with a way of upgrading the mobile device 10 with additional and/or enhanced on-device functions, communication-related functions, or both. For example, a secure communication application may be loaded onto the mobile device 10 that allows for electronic commerce functions or other financial transactions to be performed using the mobile device 10.

The I/O devices 16 may be used to display and/or compose data communication messages. In one mode of operation, a signal received by the mobile device 10, such as a text message or web page download, will be received and processed by the communication subsystem 14, forwarded to the microprocessor 12, which will preferably further process the received signal, and provide the processed signal to one or more of the I/O devices 16 such as a display 46. Alternatively, a received signal such as a voice signal can be provided to a speaker 48, or alternatively to an auxiliary I/O device 40. In another mode of operation a device user may compose a data item such as an e-mail message using a keyboard 50 in cooperation with the display 46 and possibly an auxiliary I/O device 40. Alternatively, a device user may compose a voice message via a microphone 52. The composed data item may then be transmitted over a communication network 34 using the communication subsystem 14.

A short-range communications subsystem 42 may be provided in the mobile device 10 to allow the mobile device 10 to communicate with other systems or devices, which need not necessarily be similar to device 10. For example, the short-range communications subsystem 42 may include an infrared device and associated circuitry and components or a Bluetooth™ communication module to allow the device 10 to communicate with similarly-enabled systems and devices.

The USB port 18 provides the mobile device 10 with a serial port for linking directly with other computers to exchange data and/or to receive power. The USB port 18 also provides the mobile device 10 with a means for receiving power from an external power source. For example, in a personal digital assistant (PDA)-type communication device, the USB port 18 could be used to allow the mobile device 10 to synchronize data with a users desktop computer (not shown). The USB port 18 could also enable a user to set parameters in the mobile device 10 such as preferences through the use of an external device or software application. In addition the USB port 18 may also be used to provide a means for downloading information or software to the mobile device 10 without using the wireless communication network 34. The USB port 18 can provide a direct and thus reliable and trusted connection that may for example be used to load an encryption key onto the mobile device 10 thereby enabling secure device communication.

Coupled to the USB port 18 is a USB connector 54. The USB connector 54 is the physical component that couples the USB port to the outside world. In the exemplary mobile device 10, the USB connector 54 is used to transmit and receive data from an external data/power source 56, receive power from the external data/power source 56, direct the transmitted/received data from/to the USB port 18, and direct the received power to the power subsystem 20.

The exemplary power subsystem 20 comprises a charging and power distribution subsystem 58 and a battery 60. The charging and power distribution subsystem 58 performs many functions. It may be used to transfer energy to the battery 60 from the external data/power source 56 to charge the battery 60 and also to distribute power to the many power requiring components within the mobile device 10. The charging subsystem 58 may be capable of determining the presence of a battery 60 and/or a power circuit coupled to the mobile device 10, such as an AC adapter, USB connection, or car adapter, which alternatively can act as power sources 56 to provide power for the mobile device 10 and to charge the battery 60. Additionally, the charging subsystem 58 may have the ability to determine if a power source 56 is coupled to the mobile device 10 and, in the absence of such a coupling, cause the mobile device 10 to be powered by the battery 60.

The power distributed by the charging and power distribution subsystem 58 may be derived from energy stored in the battery 60 and/or energy received from the external data/power source 56. When the battery 60 is depleted, the charging and power distribution subsystem 58 transfers energy from the power source 56 to recharge the battery 60. Optionally, the charging and power distribution subsystem 58 may also transfer energy from the power source 56 to other components in the mobile device 10 to power the mobile device 10 when the battery 60 has been depleted and is recharging. When the data/power source 56 is not connected to the mobile device 10, power for the device 10 is derived from the battery 60.

Exemplary USB Adapter

Figure 2:
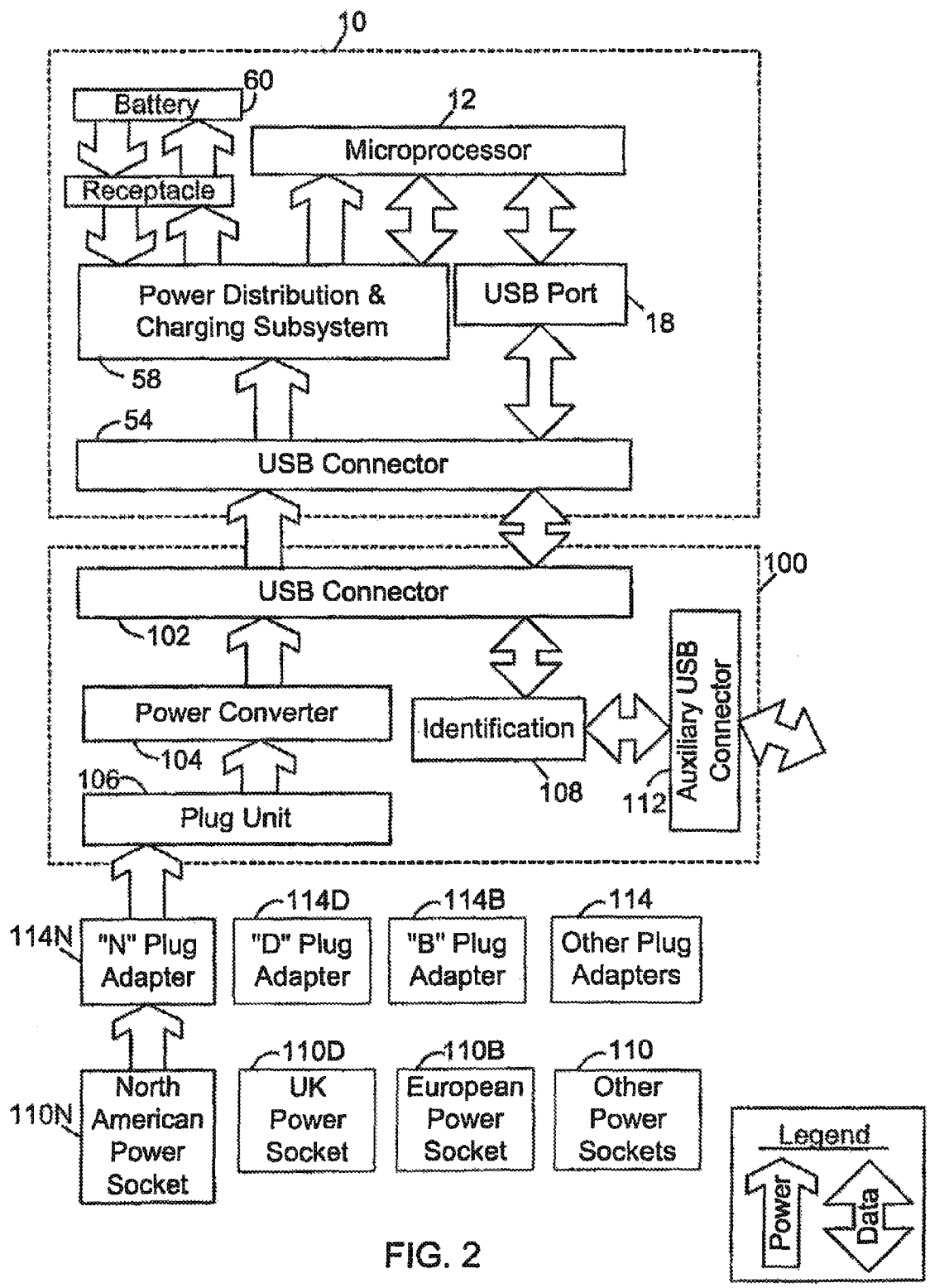
FIG. 2 is a schematic diagram of a first embodiment of a USB adapter that is coupled to an exemplary mobile device.

FIG. 2 is a schematic diagram of a first embodiment of an adapter 100 that can be used to couple the mobile device 10 of FIG. 1 to the data/power source 56 of FIG. 1. In this example the adapter 100 is a USB adapter 100 that comprises a primary USB connector 102, a power converter 104, a plug unit 106, and an identification subsystem 108. The power converter is a known element in the art and typically includes at least one of the following components: switching converter, transformer, DC source, voltage regulator, linear regulator and rectifier. In the embodiment shown in FIG. 2, the USB adapter 100 is shown coupling a mobile device 10 to one of one or more types of power sockets 110N, 110D, 110B, and 100. Also shown in FIG. 2 is an optional auxiliary USB connector 112 that can be used to couple the mobile device 10 to a data source (not shown) such as a personal computer.

In the embodiment shown in FIG. 2, the primary USB connector 102 is configured to mate with the USB connector 54 of the mobile device 10. The USB adapter 100 is operable to provide power to the mobile device 10 through the Vbus and Gnd power pins in the USB connectors 54 and 102. The USB adapter 100 also optionally provides a communication path for data across the D+ and D− data pins in the USB connectors 54 and 102.

The plug unit 106 is preferably a conventional plug unit that can be used to couple with a conventional power socket to receive power therefrom. For example, the plug unit 106 can be a two prong or three prong plug of the type used in North America that can couple to a North American AC power socket 110N that provides 115 VAC. In the embodiment shown in FIG. 2, the plug unit 106 can accept one or more types of plug adapters 114N, 114B, 114D, and 114 that are configured to couple to the plug unit 106 and are further configured to directly mate with one or more types of power sockets 110N, 110D, 110B, and 100. The plug unit 106 can be configured to receive energy from a power socket 110N, 110D, 110B, or 100, either directly or through the use of a plug adapter, and is operative to transfer the received energy to the power converter 104.

The power converter 104 is operative to receive energy from a power socket 110N, 110D, 110B, or 100 and to convert that received energy to a form that can be used by the mobile device 10. For example, the power converter 104 can be of conventional construction such as a switching power converter that converts 115 VAC to 5 VDC. Also, the power converter 104 could comprise a D.C. regulator circuit that converts a D.C. input to a D.C. output. The power converter 104 could also be adapted to accept a wide range of input energy levels and frequencies. Alternatively, the power converter 104 could be adapted to accept a limited range of input energy levels and frequencies, wherein the plug adapters are operable to convert the possible input energy levels and frequencies to a range that the power converter can accommodate. The power converter 104 provides its energy output to the mobile device 10 via the Vbus and Gnd pins of the primary USB connector 102.

Through the use of a variety of different types of plug adapters, the USB adapter 100 can be adapted to receive energy from various types of power sockets 110N, 110D, 110B, or 100. For example, using the appropriate plug adapter 114, 114B, 114D, and 114N, the USB adapter 100 can receive energy from a power socket such as an 115 VAC North American power socket 110N, or a 12 VDC automobile power socket, or an air power socket, or others.

For example, in North America, a type "N" power socket is commonly available. The plug adapter 114N can be releasably attached to the plug unit 106 thereby allowing any North American power socket 114N to be used as a power source. When traveling to a locale which does not have the North American power socket 114N, an alternate plug adapter such as adapters 114, 114B, or 114D may be selected by the user, according to the power socket 110D, 110B, or 100 available at the locale. The plug adapter 114, 114B, or 114D may then be releasably attached to plug unit 106 in place of the plug adapter 114N, thereby allowing the USB power adapter 100 to connect to a local power supply via the local power socket.

Various other plug adapters are envisioned that can be configured to operate with alternate power sources such as for instance car sockets.

The power distribution and charging subsystem 58 of the mobile device 10 can selectively use the power provided on the Vbus and Grid lines of the USB connector 54 to provide power to the mobile device 10, charge the battery 60, or both. A more detailed discussion of how the charging function of mobile device 10 can be implemented is described in U.S. Provisional Application No. 60/273,021 filed on Mar. 1, 2001 and entitled "System and Method for Adapting a USB to Provide Power for Charging a Mobile Device" which has been incorporated herein by reference.

Typically when a mobile device 10 receives power over the USB from a USB host, it is required to draw power in accordance with the USB specification. The USB specification specifies a process for transferring energy across the USB called enumeration and limits the electrical current that can flow across the USB.

The USB adapter 100 contributes to a system wherein a device 10 that follows the USB specification when coupled to a typical USB host via its USB port can be informed that the USB adapter 100 has been coupled to the device 10 and that the device 10 can now draw power without regard to the USB specification and the USB specification imposed limits.

The identification subsystem 108 provides an identification signal to the mobile device 10 that the power source is not a USB limited source. The identification signal could be the communication of a single voltage on one or more of the USB data lines, different voltages on the two data lines, a series of pulses or voltage level changes, or other types of electrical signals. The identification subsystem 108 that generates the identification signal could have multiple types of configurations. In one embodiment, the identification subsystem 108 comprises a hard-wired connection of a single voltage level to both data lines. In another embodiment, the identification subsystem 108 comprises a USB controller that is operable to communicate an identification signal to the mobile device. Additional embodiments are contemplated. The identification subsystem 108 may optionally be configured to have the capability of electrically connecting or disconnecting the power output from the power converter 104 from the USB connector 102 and/or to connect or disconnect any data inputs from the USB adapter 100 to the USB connector 102.

In addition to providing power to the mobile device 10 over the primary USB connector 102, the USB adapter 100 may optionally be equipped with an auxiliary USB connector 112 that allows the USB adapter 100 to create a communication path between the mobile device 10 and some other device capable of communicating over the USB such as a personal computer, another mobile device or some other type of device.

The USB adapter 100 preferably provides a communication path between the D+ and D− pins of the Primary USB connector 102 and the D+ and D− pins of the auxiliary USB connector 112. In the embodiment shown, the communication path also traverses the identification subsystem 108. Alternatively, the communication path could bypass the identification subsystem 108. The USB adapter 100 can thus act as a pass through device for communication between a USB hub or host and a mobile device 10.

Optionally, the USB adapter 100 could also transfer energy from the power converter 104 to the auxiliary USB connector 112 thereby providing a device coupled to the auxiliary USB connector 112 with power. In this arrangement, the identification subsystem 108 could also provide an identification signal to the device coupled to the auxiliary USB connector 112 to inform that device that the power source is not a USB limited source.

Exemplary Illustration of the Use of a USB Adapter with a Mobile Device

When a USB adapter 100 is connected to a mobile device 10, the identification subsystem 108 of the USB adapter 100 preferably provides an identification signal to the mobile device 10 to notify the mobile device 10 that the device 10 is connected to a power source that is not subject to the power limits imposed by the USB specification. Preferably, the mobile device 10 is programmed to recognize the identification signal and therefore recognizes that an identification signal has been transmitted by the USB adapter 100. After recognizing a valid identification signal, the mobile device 10, draws power through the USB adapter 100 without waiting for enumeration or charge negotiation.

Figure 3:
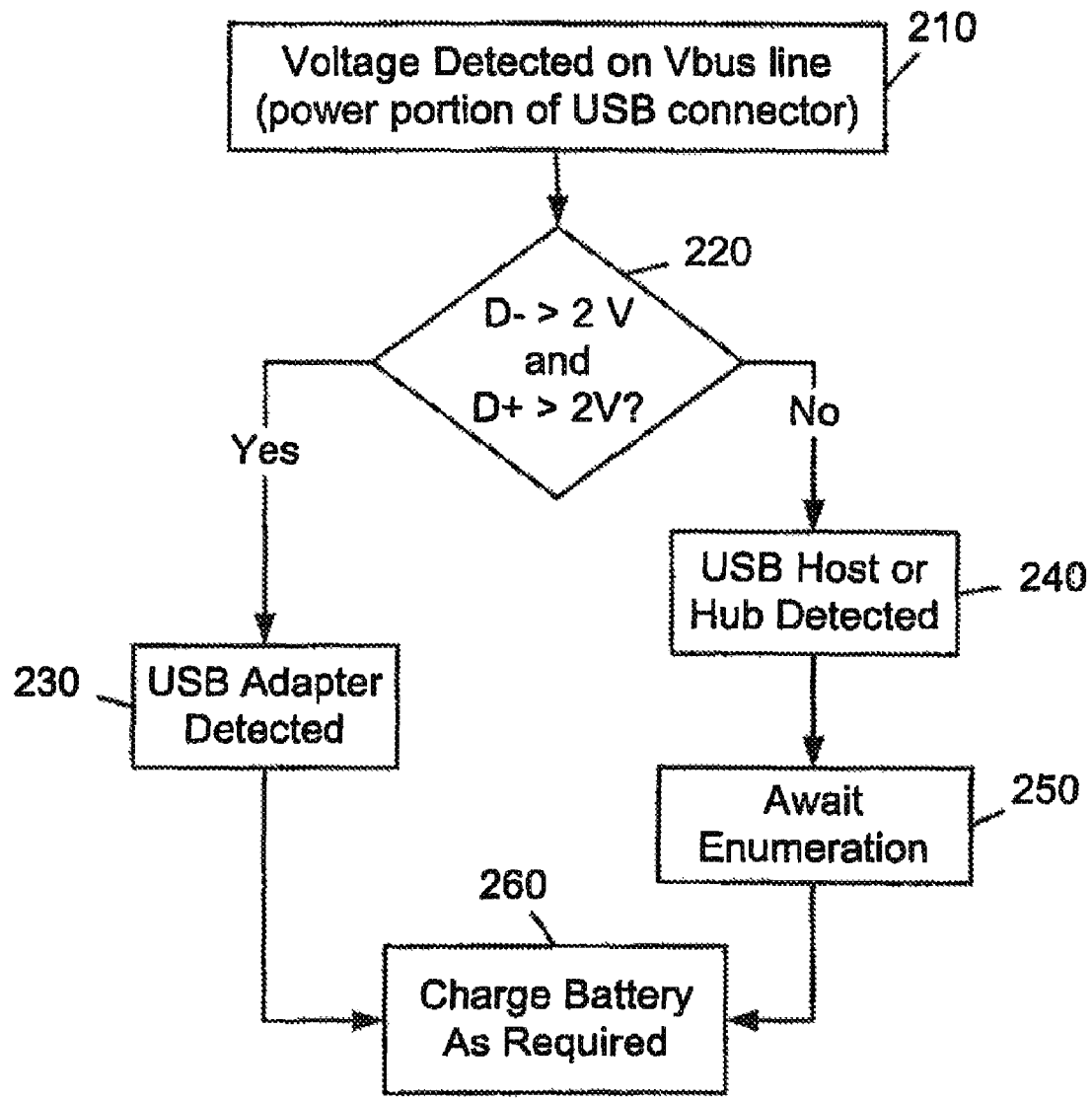
FIG. 3 is a flow chart illustrating an exemplary use of a USB adapter with a mobile device.

The detection of the identification signal may be accomplished using a variety of methods. For example, the microprocessor 12 may detect the identification signal by detecting the presence of an abnormal data line condition at the USB port 18. The detection may also be accomplished through the use of other device subsystems 44 in the mobile device 10. The preferred identification signal results from the application of voltage signals greater than 2 volts to both the D+ and D− lines in the USB connector. The preferred method of identification is described below in greater detail with reference to FIG. 3.

At step 210, the mobile device 10 detects the presence of a voltage on the Vbus line of the USB connector 54 via the USB port 18. At step 220, the mobile device checks the state of the D+ and D− lines of the USB connector. In the example shown in the drawings, the D+ and D− lines are compared to a 2V reference. Also, in this example, the identification subsystem 108 of the USB adapter 100 may have applied a logic high signal, such as +5V reference, to both the D+ and D− lines to identify the attached device as a USB adapter 100. If the voltages on both the D+ and D− lines of the USB connector are greater than 2 Volts (step 220), then the mobile device 10 determines that the device connected to the USB connector 54 is not a typical USB host or hub and that a USB adapter 100 has been detected (step 230). The mobile device 10 can then charge the battery or otherwise use power provided via the Vbus and Gnd lines in the USB connector 54 (step 260) without waiting for enumeration.

If, however, after the mobile device 10 detects the presence of a voltage on the Vbus line of the USB connector 54 and determines that the voltages on both the D+ and D− lines of the USB connector are not greater than 2 Volts (step 220), then the mobile device 10 determines that a USB host or hub has been detected (step 240). A typical USB host or hub weakly holds its D+ and D− lines at zero volts when it is not connected to another device. The mobile device 10 can then signal the USB host or hub to initiate the enumeration process (step 250) and can charge the battery or otherwise use power provided via the Vbus and Gnd lines in the USB connector (step 260) in accordance with the power limits imposed by the USB specification. The enumeration process is typically initiated after the mobile device 10 applies approximately zero volts to the D− line and approximately 5 volts to the D+ line to inform the host of the mobile device's 10 presence and communication speed.

Therefore, when a USB adapter 100 is coupled to the mobile device 10 and has been identified as a USB adapter 100, the mobile device 10 can forego the enumeration process and charge negotiation process and immediately draw energy from the USB power adapter 100 at a desired rate, for instance at 5 unit loads, i.e. 500 mA. While the mobile device 10 charges its battery using the USB adapter 100, the mobile device 10 can disable its typical USB functions. If, however, the mobile device 10 detects that a USB host or hub is coupled to the mobile device 10, the mobile device 10 can apply a voltage to the D+ line to indicate to the USB host or hub that the mobile device 10 is coupled thereto and await enumeration and USB charge negotiation.

If the USB adapter 100, is coupled to the mobile device 10, and the mobile device 10 does not identify the USB adapter 100 through communications with the identification module 108, the mobile device 10 may stop drawing energy from the Vbus and Gnd lines of the USB connector 54. This may occur, for example, if the mobile device 10 is not programmed to identify the USB adapter 100. The mobile device 10 may mistakenly identify the USB adapter 100 as a typical USB host or hub and await enumeration before drawing substantial energy. To guard against this, the USB adapter 100 can optionally be adapted to function with mobile devices that are not programmed to recognize the USB adapter 100.

In that scenario, the USB adapter 100 can be adapted to provide energy to a mobile device by using the knowledge that the mobile device will draw energy from a connected device for a period of time before it stops drawing energy due to lack of enumeration. The USB adapter 100 can optionally provide power for charging a battery 60 in a mobile device by periodically switching the voltages on the Vbus and Gnd lines between on and off states. When the USB adapter 100 is coupled to the mobile device, the identification subsystem 108 can apply an on-voltage (5 V for example) between the Vbus and Gnd lines. The mobile device will draw energy while awaiting enumeration. After a period of time, the identification subsystem 108 can apply an off-voltage (0 volts) between the Vbus and Gnd lines thereby fooling the mobile device into determining that the unidentified USB device has been disconnected from the mobile device. The identification subsystem 108 can then reapply an on-voltage between the Vbus and Gnd lines. The mobile device will draw energy again while awaiting enumeration. This cycle can be repeated to periodically apply energy to the mobile device, for example, to recharge the battery 60 of the mobile device.

Additional Exemplary Embodiments of USB Adapters

Figure 4:
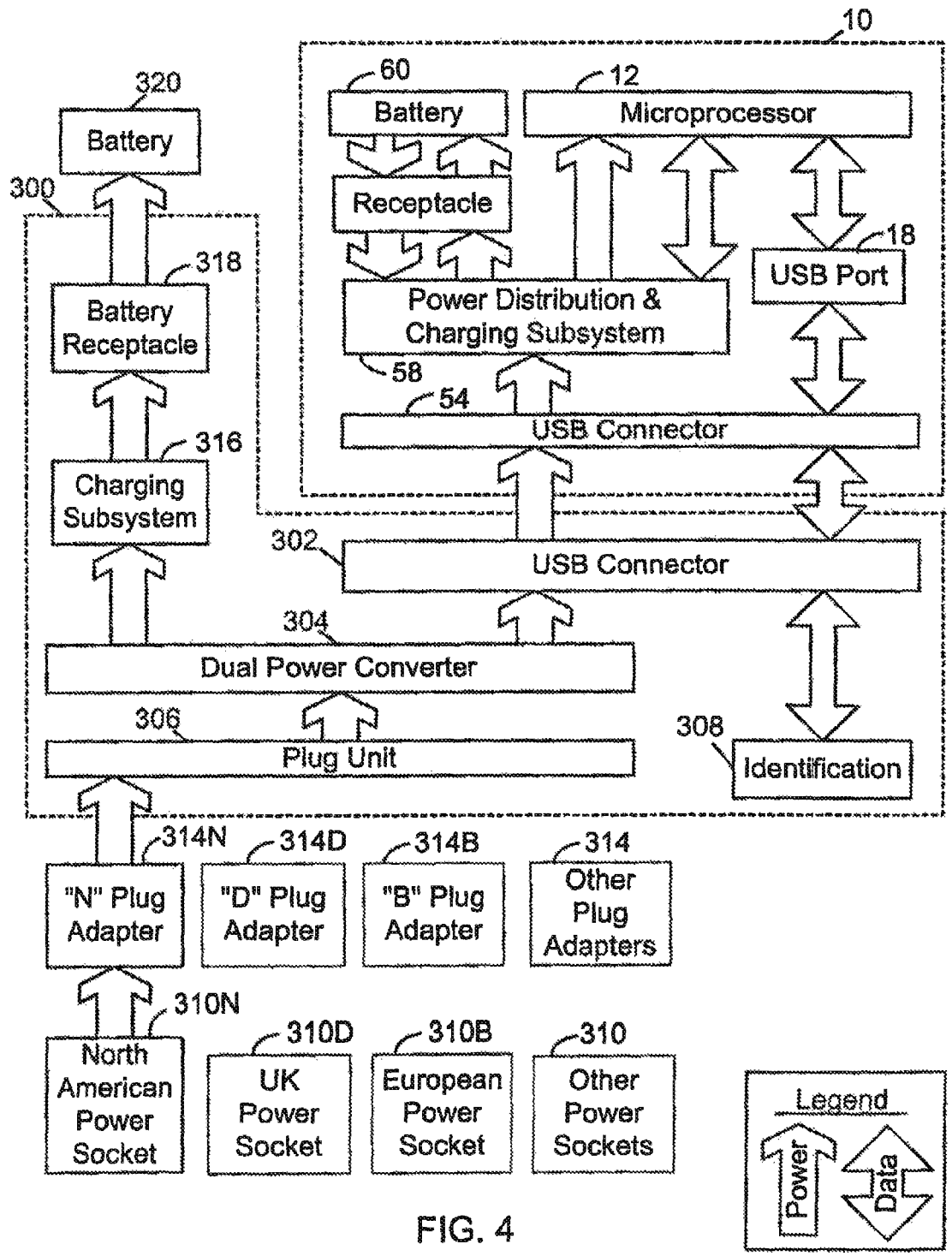
FIG. 4 is a schematic diagram of an additional exemplary embodiment of a USB adapter that is coupled to both an exemplary mobile device and an external battery.

Shown in FIG. 4 is a schematic diagram of an additional exemplary embodiment of a USB adapter 300 that is coupled to a mobile device 10. The exemplary USB adapter 300 comprises a USB connector 302, a power converter 304, a plug unit 306, and an identification subsystem 308. The USB connector 302, plug unit 306, and identification subsystem 308, preferably correspond to the USB connector 102, plug unit 106, and identification subsystem 108 which were described earlier with respect to the first embodiment. Similar to the first embodiment, the additional embodiment may optionally be equipped with various plug adapters 314N, 314D, 314B, and 314 that preferably are releasably attachable to plug unit 306 so that the appropriate plug adapter 314N, 314D, 314B, or 314 can be selected by a user to allow the USB adapter 300 to couple to and receive energy from an available power socket 310N, 310D, 310B, or 310. The exemplary USB power converter 300 further comprises a charging subsystem 316 and battery receptacle 318 for coupling the USB adapter 300 to an external battery 320 that may be optionally coupled thereto.

The battery receptacle 318 provide a location for releasably coupling an external battery 320 thereto so that the external battery can be charged via the USB adapter 300. This provides the USB adapter 300 with a mechanism for charging, for example, a mobile device's primary or spare battery when the battery has been separated from or is not coupled to the mobile device 10.

To accommodate this functionality, the power converter 304 is capable of providing the proper voltage levels for the USB connector 302 and also capable of providing necessary voltage and current levels to drive a battery charging subsystem 316. The power converter 304 is preferably a dual power converter that may be constructed using conventional or non-conventional architectures. With respect to the portion of the power converter 304 that provides energy to the USB connector 302, that portion is preferably similar in construction and function to the power converter 104 of the first embodiment.

Preferably, the charging subsystem 316 performs in a substantially similar manner to charging subsystem 58 of the mobile device 10. But, for efficiency and simplicity of design, certain aspects of the dual power converter 304 and the charging subsystem 316 may be combined, as both are local to the USB adapter 300.

Other alternative embodiments of the USB adapter may include various combinations of components described above with respect to the first and additional embodiments. Another embodiment of the USB adapter may include a second or more auxiliary USB connectors. A USB adapter having one or more auxiliary USB connectors may optionally be configured such that one or more of the auxiliary USB connectors may have power from the USB adapter's power converter made available to it so that multiple USB devices may draw power simultaneously. Preferably, a USB adapter having multiple auxiliary USB connectors will be configured such that the data lines in the auxiliary connectors can, on a selective basis, be electrically connected to or disconnected from the data lines in the primary USB connector. This allows a mobile device connected to the primary USB connector to receive energy from the adapter regardless of whether a USB host or hub is connected to an auxiliary USB connector. It is also contemplated that a USB adapter may be embodied in a USB host or hub.

CONCLUSION

The embodiments described herein are examples of structures, systems or methods having elements corresponding to the elements of the invention recited in the claims. This written description may enable those skilled in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims. Although the embodiments have been described with reference to the USB interface, it is contemplated that the invention could be applicable to devices and systems that use other standard interfaces such as the IEEE 1394 interface.

What is claimed is:

1. A mobile communication device, comprising:
a charging subsystem; and
a Universal Serial Bus (USB) port,
wherein said USB port is configured to detect an identification signal and in response draw current without waiting for enumeration.

2. The mobile communication device of claim 1, wherein said identification signal is an invalid USB data condition.

3. The method of claim 2, wherein said invalid USB data condition comprises logic high signals on the D+ and D− lines of the USB port.

4. The mobile communication device of claim 1, wherein said current exceeds limits defined in a USB Specification.

5. The mobile communication device of claim 1, wherein said current exceeds 500 mA.

6. A mobile communication device, comprising:
a charging subsystem; and
a Universal Serial Bus (USB) port,
wherein said USB port is configured to detect an identification signal and in response draw current without waiting for charge negotiation.

7. The mobile communication device of claim 6, wherein said identification signal is an invalid USB data condition.

8. The mobile communication device of claim 7, wherein said invalid USB data condition comprises logic high signals on the D+ and D− lines of the USB port.

9. The mobile communication device of claim 6, wherein said current exceeds limits defined in a USB Specification.

10. The mobile communication device of claim 6 wherein said current exceeds 500 mA.

11. A mobile device, comprising:
a Universal Serial Bus (USB) port,
wherein the device is configured to draw current from the USB port without regard to any associated conditions specified in a USB specification.

12. A mobile communication device, comprising:
a Universal Serial Bus (USB) port,
wherein the device is configured to draw power from the USB port without regard to USB specification imposed limits.

* * * * *

UNITED STATES PATENT AND TRADEMARK OFFICE
CERTIFICATE OF CORRECTION

PATENT NO. : 7,986,127 B2  
APPLICATION NO. : 12/905934  
DATED : July 26, 2011  
INVENTOR(S) : Daniel M. Fischer et al.

It is certified that error appears in the above-identified patent and that said Letters Patent is hereby corrected as shown below:

In the Specification:

Col. 1, line 42 and col. 3, line 54, "a personal digital assistants" should read --a personal digital assistant--.

Col. 6, line 8, "users desktop" should read --user's desktop--.

Col. 6, line 21, "USB port" should read --USB port 18--.

Col. 7, lines 35-36, "power converter" should read --power converter 104--.

Col. 8, line 3, "Grid" should read --Gnd--.

Col. 8, line 39, "mobile device" should read --mobile device 10--.

Col. 9, lines 28, 40, 58, "USB connector" should read --USB connector 54--.

Col. 10, lines 25, 29, 33, 38, "mobile device" should read --mobile device 10--.

Col. 11, line 1, "provide" should read --provides--.

Signed and Sealed this  
Eighth Day of November, 2011

David J. Kappos  
*Director of the United States Patent and Trademark Office*